United States Patent Office 2,929,984
Patented Mar. 22, 1960

2,929,984

METHOD AND APPARATUS FOR QUALITATIVE ELECTROMAGNETIC SURVEYING

Maunu Puranen and Aaron Assar Kahma, Helsinki, Finland, and Vaino Ronka, Ajax, Ontario, Canada, assignors to Canadian Airborne Geophysics Limited, Toronto, Ontario, Canada Application January 12, 1956, Serial No. 558,804

10 Claims. (Cl. 324—6)

This invention relates to a means and method of detecting and measuring the conductivity of bodies for geophysical and other purposes, and more particularly to such a means and method adapted to eliminate difficulties in conventional means and method which arise when the detector is moved continuously with respect to the bodies to be detected and at a considerable distance therefrom.

Electromagnetic prospecting is well known in the art. In this type of prospecting, a transmitting coil is supplied with an alternating electrical current, thus setting up an alternating magnetic field (usually termed the primary field). If this field comes into contact with a conductive body, it will cause alternating eddy currents to be induced in such body, which eddy currents set up their own alternating magnetic field (usually termed the secondary field). This secondary field may be detected by a receiving coil and the measure of this field will give an indication of the nature of the conductive body in question. This secondary field, because the conductive bodies possess both resistance and inductance properties, will be more or less out-of-phase with the primary field, that is the secondary field will have a quadrature component with respect to the primary field.

The measure of this quadrature component, as well as the amplitude of the secondary signal can be used to indicate the presence and relative conductivity of the conductive bodies producing the secondary field.

When the art of electromagnetic prospecting was in its infancy, all measurements were made from fixed positions. Lately, however, interest in airborne electromagnetic prospecting has become wide-spread. In such prospecting the transmitting coil and the alternating current generator have, because of the large size required for optimum results, been located in the prospecting aircraft, while the receiving coil has been towed beneath the aircraft in a glider or bird, so as to bring the receiving coil as close as possible to the source of the relatively weak secondary field. With such an arrangement, the receiving coil is exposed, not only to the secondary field to be measured, but also to the relatively much stronger primary field from the aircraft.

A number of factors influence the flight of an aircraft with the result that small variations of speed, attitude and altitude occur frequently. These changes influence the mutual spacing of aircraft, bomb and geologic structure; the attitudes of aircraft and bomb are also affected. Since the primary field is relatively strong at the receiving coil, and since the strength of the field varies as the third power of the distance between the coils, a minor variation in the spacing between aircraft and bomb, can cause a difference in the amplitude of the primary signal which would in many cases mask entirely the effect of the secondary signal which is relatively weak. Relative angular displacements between transmitting and receiving coils can also change the amplitude of the received signal. Therefore a major problem in the design of such a mobile detection system is the elimination of spurious data introduced by the relative motions of the aircraft and bird.

As has been pointed out, electromagnetic detection of conductive bodies may be divided into two general classes.

(1) *Amplitude measurement.*—Measurement of the magnitude of the secondary field without regard to phase.

(2) *Phase measurement.*—(a) Measurement of in-phase and quadrature components separately, and (b) measurement of quadrature component alone. This may be done by measuring the phase angle between the primary and total fields ($\theta$ in Fig. 2) or by measuring the magnitude of the quadrature component.

Theoretically, quadrature component measurement has been found most effective for bodies of higher resistance since such bodies provide the greatest relative quadrature component, whereas prospectors are generally interested in bodies of very low resistance. However, the phase measurement system has many practical advantages as will hereinafter be pointed out in detail, which outweigh this consideration.

It is a principal object of this invention, therefore, to provide a means and method of electromagnetic detection which will eliminate the difficulties heretofore caused through variations in the relative position between transmitting and receiving coils.

It is another object of this invention to provide a means and method of electromagnetic surveying which will eliminate the possibility of receiving spurious data at the receiving coil through variations in the intensity of the primary field at the receiving coil.

It is still a further object of this invention to provide a phase measurement means and method whereby a better differential may be made between conductive bodies of high resistance, and conductive bodies of probable commercial interest.

These and other advantageous objects will become apparent through a consideration of the following detailed description taken in conjunction with the attached drawings in which.

Figure 1:
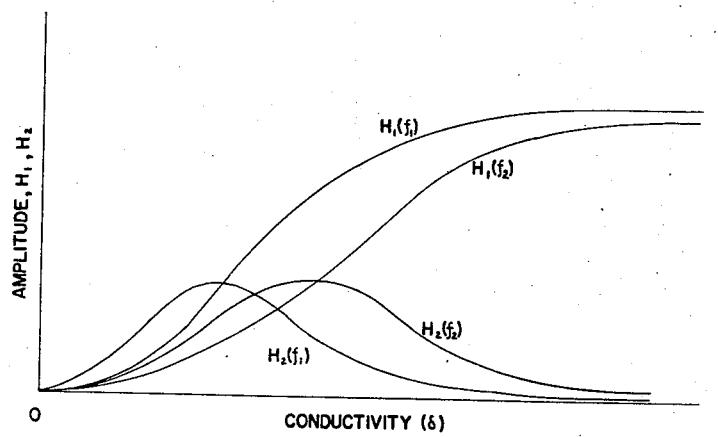
Figure 1 is a graph showing the variation in magnitude of in-phase component ($H_1$) and quadrature components ($H_2$) of the secondary field signal with respect to the frequency of the transmitted field and conductivity of the ore body.

It is well known in the field of geophysics that the amplitude and phase of the secondary field, for a particular set of conditions, varies with the frequency of the primary field. Although the phase of the secondary field reaches a limit of 90° with respect to the primary field at zero frequency, in practice this is not readily measured, since the amplitude of the signal derived from the secondary field tends to zero at zero frequency. Figure 1 represents the response of in-phase and quadrature components at two frequencies as a function of mineral body conductivity. In this graph, the combined amplitude and phase variations result in a peak of quadrature component response. If the response of only one frequency be considered, it is apparent that there exist two values of conductivity for each amplitude response except the peak value. When a measurement under the same conditions is made at another frequency, the ambiguity can be resolved by observing the ratio of the two responses.

This invention makes use of this fact by providing two transmitting frequencies, and two receiving coils mounted with their axes horizontal and parallel and relatively close together compared with the separation between the transmitting and receiving coils, whereby the phase angle, $\theta$, at each frequency may be detected and recorded and employed to give both an indication of the presence of a conductive body and an indication of the properties (conductivity) of such body. The two receiving coils are mounted in a bomb-shaped enclosure (or bird) which is towed beneath the aircraft.

It is an essential feature of this invention that transmitted fields of two different frequencies be employed. This may be done by using a single transmitting coil in a doubly resonant circuit with two generators of the appropriate frequencies, or alternatively, two separate transmitting coils may be used, each supplied by a generator of the prescribed frequency.

The frequencies involved in electromagnetic prospecting are not critical and are well known in the art. In general they will not be more than 10 kilocycles. According to the method of this invention it is necessary to have a substantial separation between the two frequencies to produce a measurably different response in the ore body. In addition such a substantial preparation will permit isolation of the two frequencies and processing in separate channels. A suitable pair of frequencies would be 400 and 3000 cycles.

The transmitting coil, located in the aircraft, is placed horizontally, i.e. with its magnetic axis vertical.

Figure 3:
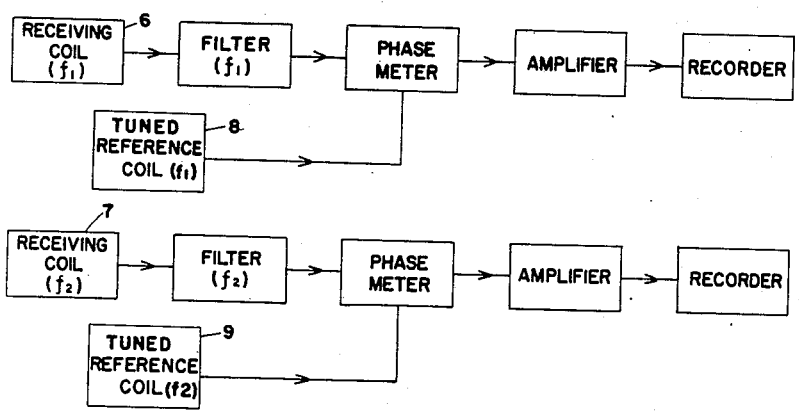
Figure 3 is a functional block diagram showing the receiving coil circuits for the phase angle measurement system.
Figure 4:
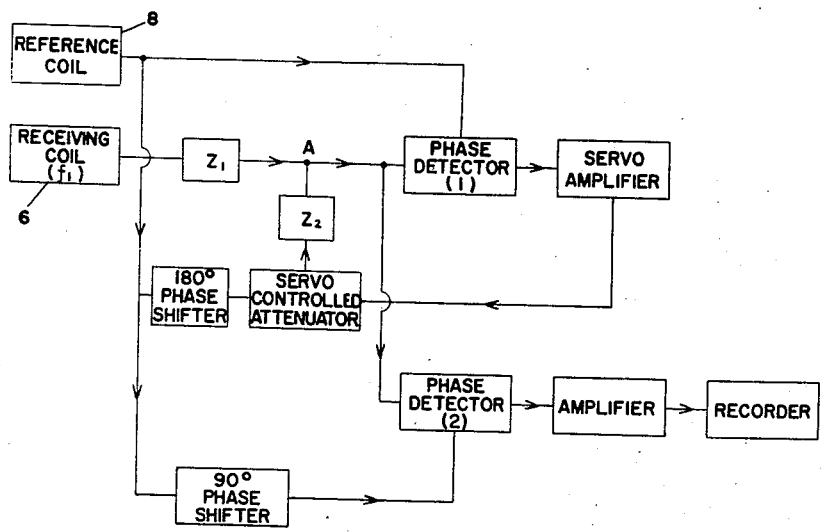
Figure 4 is a functional block diagram of one channel of a quadrature component measurement system.

Each receiving coil is usually, although not necessarily, tuned to the related transmitted frequency and by means of suitable filters, etc. is connected in a circuit with suitable measuring and detecting means preferably located in the prospecting aircraft (see Figures 3 and 4).

Figure 2:
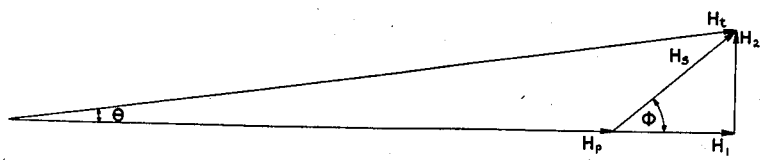
Figure 2 is a vector diagram illustrating the effect of the secondary field on the signal received at the receiving coil.

In operation, each primary field intersects the receiving coils and induces a strong in-phase primary voltage in the appropriate receiving coil ($H_p$ in vector diagram, Figure 2). In the presence of a conductive body, the resulting secondary field induces a secondary voltage in the appropriate receiving coil ($H_s$ in vector diagram, Figure 2). This secondary voltage is composed of an in-phase and a quadrature component $H_1$ and $H_2$ respectively.

The in-phase component $H_1$ is very small when compared with the primary component $H_p$, so that the sum of $H_p$ and $H_1$ does not change appreciably when $H_1$ varies due to the presence of conductive bodies as encountered in a geophysical survey. $H_2$ in practice does vary from zero to a value such as to give a phase angle of $\Phi$ and the total field, $H_t$, has a phase angle $\theta$ compared to the primary field.

It should be noted that if the primary component $H_p$ is increased or decreased through a variation in the relative position between transmitting coil and receiving coil, no false signal is given but rather the sensitivity of the system (i.e. phase angle $\theta$) is merely increased or decreased slightly. If amplitude were measured, however, such a variation would introduce a false signal tending to confuse the observer. Such a variation in the relative positions of receiving coil and transmitting coil will frequently be encountered in airborne electromagnetic survey work where variations in flight conditions will cause the towed bomb to occupy varying positions and attitudes.

Since in this application the receiving coils have their common axes approximately aligned with the primary field vector, the variation of the primary field component $H_p$ with receiving coil attitude, obeys a cosine function, and does not change appreciably for the small angular deviations of the receiving coils likely to be encountered in practice.

The quadrature component can also be simply computed from the phase angle $\theta$ between the total field $H_t$ and the primary field $H_p$ affecting the receiving coil. If phase angle $\theta$ is small, as generally is the case in airborne surveys, the phase angle and the quadrature component are directly proportional to each other. By measuring the phase angle, we thus also are able to determine the quadrature component, and conversely. A simple way to measure the phase angle is illustrated by the functional block diagram in Figure 3. The phasemeter may be one of several electronic circuits familiar to those skilled in the field. The reference coil is a coil placed in vicinity of transmitting coil and adapted to pick up a signal from the primary field. Each coil is tuned to its operating frequency to attenuate the other transmitted frequency.

To avoid any influence from variation in amplitude of the received signal, the signal can be amplitude-limited before it reaches the phase meter and therefore only the relative phase is indicated by the recorder.

In operation, each receiving coil will be in a circuit such as that shown schematically in Figure 3 whereby the phase angle $\theta$ may be measured and recorded for each transmitted frequency. The existence of a phase shift at either frequency is an indication of the presence of a conductive body, and a comparison of the phase angle $\theta$ at each frequency will give an indication as to the class or size of the material involved.

An alternative phase method is illustrated in Figure 4. In this technique the in-phase component is reduced to a very small magnitude before extracting and measuring the quadrature component magnitude. This method imposes less stringent requirements on the phase detectors than if a single phase detector is used to measure the magnitude of the quadrature component directly.

The received signal and reference phase are derived from the receiver coil in the bird and the reference coil adjacent to the primary coil respectively, as in the previous method. The in-phase reference voltage is injected into the phase detector (1) through impedance $Z_1$ (which in practice will be a resistor) and the output from this detector is amplified and used to position an attenuator which controls the magnitude of inverted reference voltage injected through $Z_2$ (which will also be a resistor in practice) into the input of phase detector (1). The attenuator can be any convenient motor driven potentiometer or electronic attenuator both of which are well known in servo equipment. This forms a negative feedback loop which tends to maintain the in-phase component at junction A at a minimum. The resultant signal at this point is almost entirely quadrature component if any secondary field is present (depending on the loop gain) and it is applied to phase detector (2) which has a reference phase in quadrature with the in-phase voltage. This phase detector acts as a second stage of selection for the quadrature component and the output is amplified and recorded. No limiting is involved in this technique and the recorded signal is a measure of the quadrature component magnitude. A similar system can be employed for the second frequency. In this method, as in the other, the circuits can be of conventional form according to the functional descriptions specified.

Figure 5:
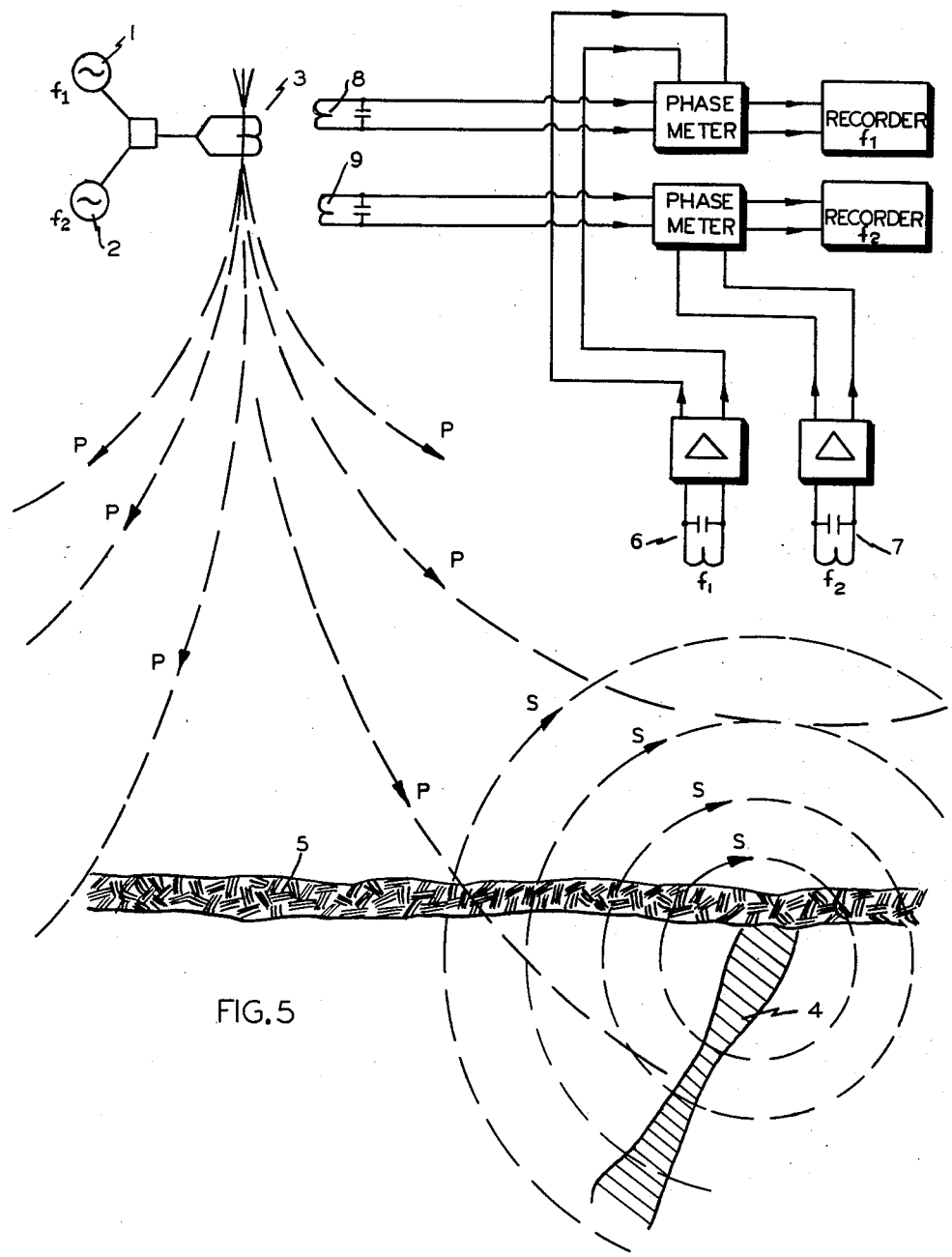
Figure 5 is a schematic view showing the operation of the apparatus under the influence of a secondary field created by an ore body.

The operation of the entire system may be seen by reference to Figure 5. In this figure 1 is the A.C. generator for frequency $f_1$ and 2 the generator for $f_2$. These generators supply the transmitting coil 3 which sets up primary field shown by arrows P. This field, upon encountering an ore body such as 4 which may lie beneath an overburden 5 creates a secondary field shown by arrows S.

Receiving coil 6 receives the second field of frequency $f_1$ while receiving coil 7 receives the secondary field $f_2$. $f_1$ and $f_2$ are separately recorded as shown in the drawings, reference coils 8 and 9 detecting frequencies $f_1$ and $f_2$ respectively and feeding these reference signals for recordal of the phase shift of $f_1$ and $f_2$ secondary signals.

There has been described above several specific embodiments of the invention which forms the subject matter of this application. It is to be understood, however, that precise circuitry outlined and process means are to be construed as exemplary only. Such embodiments of the invention as fall within the scope and purview of the appended claims are to be considered as part of this invention.

What we claim as our invention is:

1. Apparatus for electromagnetic detection and analysis of conductive bodies which comprises two electric generators of different frequencies, means for radiating the output of said generators; said radiating means thus being operable to produce two separate primary alternating magnetic fields of said frequencies, thereby causing secondary fields to be generated by currents induced in said conductive bodies, two receiving coils, mounted with their axes parallel separate detecting means connected to each receiving coil, each said detecting means being operable to measure one of the amplitudes of the quadrature component of the secondary field and the phase angle between the primary field and the combined primary and secondary fields linking its coil.

2. Apparatus for airborne electromagnetic detection and analysis of conductive bodies which comprises two electric generators of different frequencies and at least one transmitting coil connected to said generators, all mounted in the prospecting aircraft, said transmitting coil thus being capable of producing two separate primary alternating magnetic fields of said frequencies, a bird towed beneath said prospecting aircraft, two receiving coils mounted in said bird with their axes parallel, and separate detecting means in circuit with each such receiving coil and operable to detect the magnitude of the quadrature component of the secondary field induced in said conductive bodies by one of the primary fields.

3. Apparatus for airborne electromagnetic detection and analysis of conductive bodies which comprises two electric generators of different frequencies, at least one transmitting coil in circuit with said generators, all mounted in the prospecting aircraft, said transmitting coil thus being capable of producing a pair of primary alternating magnetic fields, a bird towed beneath said prospecting aircraft, two receiving coils mounted in said bird with their axes parallel, and separate detecting means in circuit with each such receiving coil and operable to measure the phase angle between one of the primary fields and the total field linking said coil.

4. Apparatus for airborne electromagnetic detection and analysis of conductive bodies which comprises two electric generators of different frequencies and a transmitting coil in a doubly resonant circuit with said generators, all mounted in the prospecting aircraft, said transmitting coil thus being capable of producing two separate primary alternating magnetic fields of said frequencies, a bird towed beneath said prospecting aircraft, two receiving coils mounted in said bird, each of said receiving coils being tuned to one of the generator frequencies, and separate detecting and recording means in circuit with each such receiving coil and operable to measure and record the magnitude of the quadrature component of the secondary field induced in said conductive bodies by one of the primary fields.

5. Apparatus for airborne electromagnetic detection and analysis of conductive bodies which comprises two electric generators of different frequencies, at least one transmitting coil, in circuit with both of said generators, a pair of reference coils tuned to different ones of said frequencies, all mounted in the prospecting aircraft, said transmitting coil thus being capable of producing a pair of primary alternating magnetic fields, a bird towed beneath said prospecting aircraft, two receiving coils mounted in said bird, each of said receiving coils being tuned to one of the generator frequencies, and separate detecting and recording means in circuit with each such receiving coil and each said reference coil and operable to measure the magnitude of the quadrature component of the secondary field induced in said conductive bodies by one of the primary fields.

6. A method for electromagnetic detection and analysis of conductive bodies which comprises simultaneously producing two separate and primary alternating magnetic fields of different frequencies, thereby causing secondary fields to be generated by currents induced in said conductive bodies, detecting the combined primary and secondary fields for each of said frequencies at a location spaced from said conductive bodies, and detecting one of the magnitude of the quadrature component of the secondary field and the phase angle between the primary field and the combined fields for each of said frequencies.

7. A method for electromagnetic detection and analysis of conductive bodies which comprises simultaneously producing two separate and primary alternating magnetic fields of different frequencies, thereby causing secondary fields to be generated by currents induced in said conductive bodies, detecting the combined primary and secondary fields for each of said frequencies at a location spaced from said conductive bodies, and detecting and recording one of the magnitude of the quadrature component of the secondary field and the phase angle between the primary field and the combined fields for each of said frequencies.

8. A method for electromagnetic detection and analysis of conductive bodies which comprises simultaneously producing two separate and primary alternating magnetic fields of different frequencies, thereby causing secondary fields to be generated by currents induced in said conductive bodies, detecting the combined primary and secondary fields for each of said frequencies at a location spaced from said conductive bodies, and detecting and recording separately the magnitude of the quadrature component of each secondary field.

9. A method for electromagnetic detection and analysis of conductive bodies which comprises simultaneously producing two separate and primary alternating magnetic fields of different frequencies, thereby causing secondary fields to be generated by currents induced in said conductive bodies, detecting the combined primary and secondary fields for each of said frequencies at a location spaced from said conductive bodies, and detecting and recording separately the phase angle between the primary field and the combined fields for each of said frequencies.

10. The apparatus of claim 1 in which said transmitting means includes a coil in a doubly resonant circuit with said generators, said receiving coils being tuned to different ones of the generator frequencies, and including separate recording means for each detecting means to record the output thereof.

References Cited in the file of this patent

UNITED STATES PATENTS

| | | |
|---|---|---|
| 2,623,924 | Cartier | Dec. 30, 1952 |
| 2,642,477 | Puranen | June 16, 1953 |
| 2,794,949 | Hedstrom | June 4, 1957 |